US012586194B2

(12) United States Patent
Schade et al.

(10) Patent No.: US 12,586,194 B2
(45) Date of Patent: Mar. 24, 2026

(54) ARRANGEMENT AND METHOD FOR THE OPTICAL ASSESSMENT OF CROP IN A HARVESTING MACHINE

(71) Applicant: DEERE & COMPANY, Moline, IL (US)

(72) Inventors: Peter Schade, Bad Dürkheim (DE); John P. Just, Ames, IA (US); Ambarish Panambilly, Kaiserslautern (DE)

(73) Assignee: Deere & Company, Moline, IL (US)

( * ) Notice: Subject to any disclaimer, the term of this patent is extended or adjusted under 35 U.S.C. 154(b) by 447 days.

(21) Appl. No.: 18/048,923

(22) Filed: Oct. 24, 2022

(65) Prior Publication Data

US 2023/0196575 A1      Jun. 22, 2023

(30) Foreign Application Priority Data

Dec. 17, 2021    (DE) .......................... 102021133626.0

(51) Int. Cl.
*G06T 7/00* (2017.01)
*B60W 50/14* (2020.01)
(Continued)

(52) U.S. Cl.
CPC ........... *G06T 7/0014* (2013.01); *B60W 50/14* (2013.01); *G06V 10/761* (2022.01); *G06V 10/82* (2022.01);
(Continued)

(58) Field of Classification Search
CPC .... G06V 10/761; G06V 10/82; G06V 20/188; G06V 20/56; A01D 41/127; G06T 7/0014; G06T 2207/30188; G06T 2207/30252; B60W 50/14; B60W 2300/158; B60W 2420/403; B60W 2050/146

See application file for complete search history.

(56) References Cited

U.S. PATENT DOCUMENTS 4,975,863 A    12/1990  Sistler et al.
6,285,198 B1    9/2001  Nelson et al.
(Continued)

FOREIGN PATENT DOCUMENTS

DE    102004063769 A1    7/2006
DE    102020118160 A1    1/2021
(Continued)

OTHER PUBLICATIONS

Khan A, Asim W, Ulhaq A, Ghazi B, Robinson RW. Health assessment of eucalyptus trees using siamese network from Google street and ground truth images. Remote Sensing. Jun. 4, 2021;13(11):2194. (Year: 2021).*
(Continued)

*Primary Examiner* — Tracy Mangialaschi
(74) *Attorney, Agent, or Firm* — Hanley, Flight & Zimmerman, LLC

(57)      ABSTRACT

A system for optical assessment of crop in a harvesting machine comprising: a camera configured to record an image of the crop; and an image processing system configured to receive the supplied image from the camera and a reference image and generate an output value based on a degree of similarity between the reference image and the supplied image.

20 Claims, 3 Drawing Sheets

(51) Int. Cl.

| | | |
|---|---|---|
| *G06V 10/74* | (2022.01) | |
| *G06V 10/82* | (2022.01) | |
| *G06V 20/10* | (2022.01) | |
| *G06V 20/56* | (2022.01) | |

(52) U.S. Cl.
CPC ............ *G06V 20/188* (2022.01); *G06V 20/56* (2022.01); *B60W 2050/146* (2013.01); *B60W 2300/158* (2013.01); *B60W 2420/403* (2013.01); *G06T 2207/30188* (2013.01); *G06T 2207/30252* (2013.01)

(56) References Cited

U.S. PATENT DOCUMENTS

| | | | | |
|---|---|---|---|---|
| 2014/0050364 | A1* | 2/2014 | Brueckner | ............. G06V 20/68 |
| | | | | 382/110 |
| 2016/0350336 | A1 | 12/2016 | Checka et al. | |
| 2018/0035609 | A1* | 2/2018 | Barbi | ...................... G06T 7/001 |
| 2023/0027496 | A1* | 1/2023 | Rajakumar | .......... G05D 1/0238 |

FOREIGN PATENT DOCUMENTS

| | | | |
|---|---|---|---|
| EP | 0908086 | A1 | 4/1999 |
| EP | 1763988 | A1 | 3/2007 |
| EP | 1956361 | A2 | 8/2008 |
| EP | 2057882 | A2 | 5/2009 |
| EP | 2570968 | A2 | 3/2013 |
| EP | 3038054 | A2 | 6/2016 |

OTHER PUBLICATIONS

Mukhtar H, Khan MZ, Khan MU, Younis H. Wheat disease recognition through one-shot learning using fields images. In 2021 International Conference on Artificial Intelligence (ICAI) Apr. 5, 2021 (pp. 229-233). IEEE. (Year: 2021).*

R. Ruan et al., Estimation of weight percentage of scabby wheat kernels using an automatic vision and neural network based system, Transactions of the ASAE, Jan. 2001, pp. 983-988, DOI:10.13031/2013.6230.

B. Ni et al., Design of an Automated Corn Kernel Inspection System for Machine Vision, Transactions of the ASAE, 1997, pp. 491-497, vol. 40(2).

G. Koch et al., Siamese Neural Networks for One-shot Image Recognition, Proceedings of the 32nd International Conference on Machine Learning, Lille, France, 2015. JMLR: W&CP vol. 37, pp. 1-8, [online], [retrieved on Dec. 8, 2021]. Retrieved from the Internet <URL: chrome-extension://efaidnbmnnnibpcajpcglclefindmkaj/https://www.cs.cmu.edu/~rsalakhu/papers/oneshot1.pdf>.

D. Chicco, "Siamese neural networks: an overview", Artificial Neural Networks, Methods in Molecular Biology, 2190 (3rd ed.), New York City, New York, USA: Springer Protocols, Humana Press, pp. 73-94 (2020), Retrieved from the Internet <URL: https://link.springer.com/book/10.1007/978-1-0716-0826-5>.

Extended European Search Report and Written Opinion issued in European Patent Application No. 22201670.1, dated May 15, 2023, in 11 pages.

Kandadai RM et al., A knowledge-base generating hierarchical fuzzy-neural controller, IEEE Transactions n Neural Networks, IEEE Service Center, Piscataway, NJ, US, Bd. 8, Nr. 6, Nov. 30, 1997, pp. 1531-1540, ISSN: 1045-9227, DOI: 10.1109/72.641474.

\* cited by examiner

ARRANGEMENT AND METHOD FOR THE OPTICAL ASSESSMENT OF CROP IN A HARVESTING MACHINE

RELATED APPLICATIONS

This document claims priority based on German Patent Application No. 102021133626.0, filed on Dec. 17, 2021, which is hereby incorporated by reference into this application.

DESCRIPTION

The present invention relates to an arrangement for the optical assessment of crop in a harvesting machine.

BACKGROUND

Combine harvesters are large machines which reap, thresh and winnow grain from a field. A combine harvester comprises a multiplicity of adjustable elements, such as the size of the openings of a threshing concave or a separating grid, the size of a threshing gap, the rotational speed of a threshing drum, the speed of a winnowing fan or the position of blades of a sieve. The optimal working parameter of these elements depends on the type of crop and its properties and may change over time. The setting of these parameters is conventionally carried out by the operator of the combine harvester on the basis of operating instructions or their experience, or automatically, by using values saved in a memory which are accessed by the operator as a function of the current environmental and crop conditions. In the past, many sensors have been proposed for registering crop properties (such as capacitive moisture sensors, cameras and near-infrared spectrometers) in order to register crop properties on-board the combine harvester and to provide the operator with an indication of the currently existing properties of the crop after processing in the harvesting machine, on the basis of which they (or an automatic controller) may vary parameters of the operating process in the harvesting machine. For example, they may increase the threshing gap and reduce the rotational speed of the threshing drum when the damaged kernel fraction is too high.

BRIEF DESCRIPTION

A system for optical assessment of crop in a harvesting machine comprising: a camera configured to record an image of the crop; and an image processing system configured to receive the supplied image from the camera and a reference image and generate an output value based on a degree of similarity between the reference image and the supplied image.

A method for optical assessment of crop in a harvesting machine comprising: recording, with a camera, a supplied image of the crop; receiving, with an image processing system, the supplied image from the camera and a reference image; determining a degree of similarity of the reference image and the supplied image; and generating an output value relating to a property of the crop using at least in part the determined degree of similarity.

An apparatus for optical assessment of crop in a harvesting machine comprising: a camera configured to record an image of the crop; and an image processing system, in communication with the camera, configured to receive the supplied image from the camera and generate an output value based on a degree of similarity between a reference image and the supplied image.

BRIEF DESCRIPTION OF DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
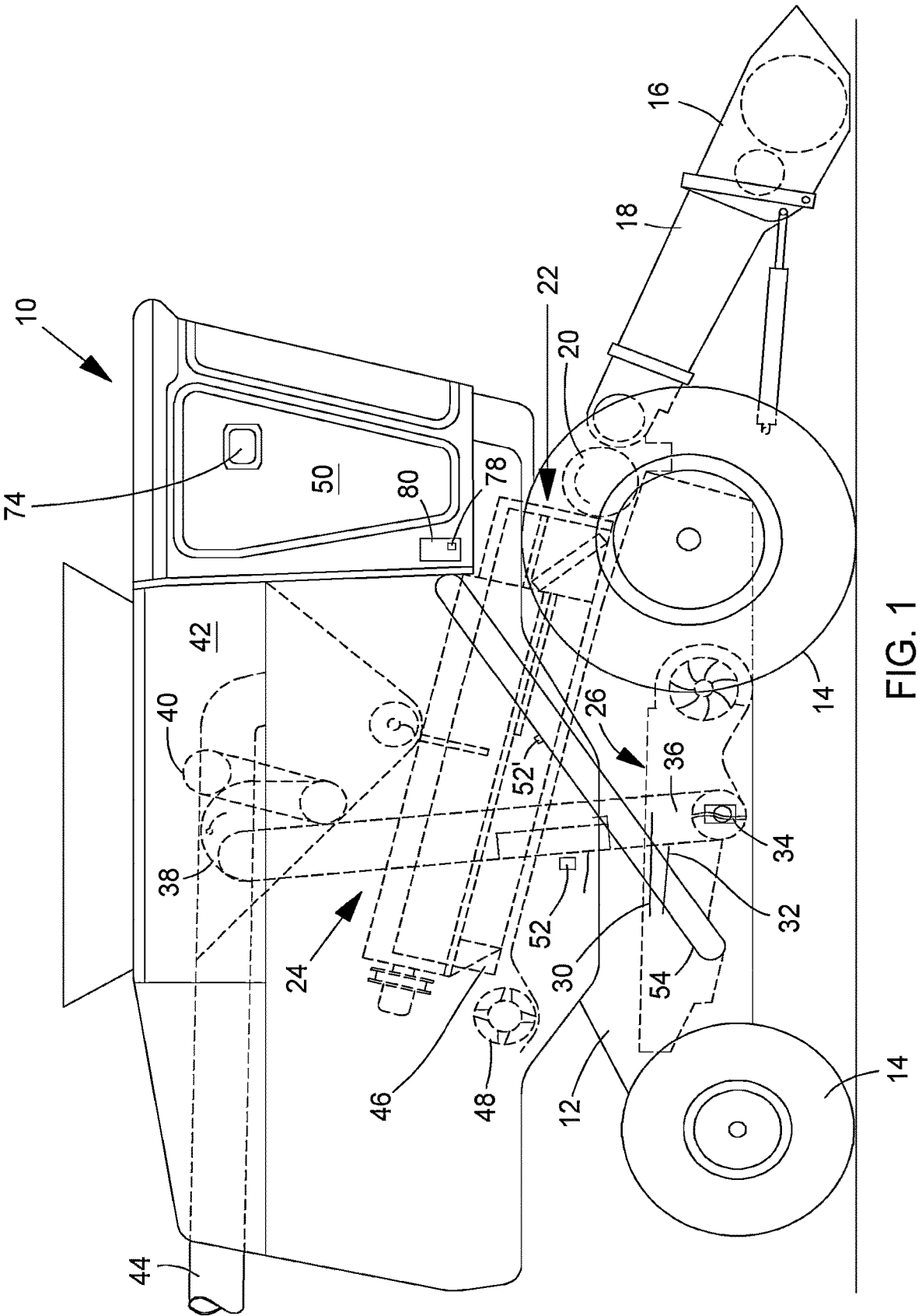
FIG. 1 is a side view of a harvesting machine.

In order to obtain information for the manual or automatic setting of parameters of the processing operation of a combine harvester, in particular a camera is suitable, which for example registers an image of the winnowed grain before it enters the grain tank, or an image of the material in the tailings feeder which delivers crop from the rearward end of a sieve back to the threshing process or to a separate secondary thresher.

Since an unprocessed image is scarcely informative, in particular for less experienced operators, and the operator also does not have the time to look continuously at a screen on which the image of the camera is displayed, the image is generally processed by an electronic image processing system, in order on the one hand to display to the operator certain particles, such as damaged kernel or impurities highlighted in colour or otherwise in the represented image of the crop, and on the other hand to be able to display quantitative values (for example in respect of the damaged kernel and/or impurity fraction) derived from the image. These quantitative values may, as already mentioned, be used for manual or automatic setting of parameters of the processing operation in the harvesting machine.

According to current approach for using the images, images are recorded with different settings of the combine harvester and the best of these is found in order ultimately to use the setting of the combine harvester for which the best image has been recorded (EP 1 763 988 A1). For selecting the best image, it is possible to use an automatic selection algorithm which recognizes certain features in the image, for example impurities. In this case, a current image generated with the aid of the crop respectively being processed is not analysed, but instead the operator or the selection algorithm searches from different images generated in a series of tests for the one which best represents the desired properties.

Another approach consists in analysing the recorded images continuously (online) in order to derive the desired quantities therefrom. For instance, European Patent Appl. No. EP 2 057 882 A2 describes a combine harvester having an image processing system which initially performs a brightness comparison on the digitized recorded image data. The image is then subjected to segmentation, which may be carried out in an individual-object and/or edge-oriented manner. In individual-object oriented segmentation, the image is decomposed into individual objects defined by equal brightness or colour values. With the aid of a comparison of the brightness of the respective region with a setpoint value or an average value of the brightness of the image, whether the region represents a damaged kernel is deduced. The area of the damaged kernel is determined by counting the pixels of the region, and the damaged kernel fraction is evaluated with the aid of a comparison with the number of pixels of the image. Edge oriented segmentation is used to identify impurities and is based on an assessment of the lengths of the boundaries of the individual objects.

In the event of a sufficient size of the object, it is assumed that it is a piece of short straw. The areas of the objects identified as short straw are likewise set in relation to the size of the overall image, in order to determine the fraction of impurities. The allocation of the image objects to the classes "damaged kernel" or "short straw" is accordingly carried out only with the aid of the brightness of the individual objects, or their length. A similar procedure for the analysis of stationary crop particles is described in U.S. Pat. No. 4,975,863. Here, the image is accordingly analysed with the aid of properties programmed in advance (brightness and edge length of particles belonging together). For this purpose, the algorithm needs to be adapted to the respective crop, at least in respect of the properties to be evaluated, and correspondingly programmed, which is relatively elaborate when different types of crop are intended to be processed and analysed.

In another approach which is often used, the image is pre-processed in order to identify individual objects (for example whole grains, damaged kernel and impurities) and subsequently supply the information in respect of the objects identified to an algorithm which subjects the respective objects to classification, in order ultimately to draw conclusions, for example in respect of the fraction of impurities or damaged kernel, and propose improved settings of the combine harvester on the basis thereof. In this case, a neural network is conventionally used, which is supplied beforehand in a learning phase with example images and associated manually generated classifications (see German Patent Appl. No. DE 10 2004 063 769 A1; European Patent Appl. No. EP 2 570 968 A2; German Patent Appl. No. DE 10 2020 118 160 A1; European Patent Appl. No. EP 3 038 054 A2; R. Ruan et al., Estimation of weight percentage of scabby wheat kernels using an automatic vision and neural network based system, Transactions of the ASAE Vol 44(4): 983-988 (2001) and B. Ni et al., Design of an Automated Corn Kernel Inspection System for Machine Vision, Transactions of the ASAE, Vol. 40(2): 491-497, (1997)). Again, it is first necessary to carry out a learning process in which the neural network is trained with the aid of crop having known properties.

In one example of the present disclosure, an arrangement for the optical assessment of crop in a harvesting machine comprises a camera which is arranged to record an image of the crop, and an image processing system which can be supplied with the image signal of the camera and a reference image of crop and calculates and outputs a degree of similarity of the reference image with the image signal. The similarity between the image signal of the camera and the reference image is therefore determined, which makes the supervised learning processes provided current approaches unnecessary. The camera may look into a channel in which the crop flows, or it may monitor the crop at any other desired place in a harvesting machine. The harvesting machine may be a combine harvester or any other desired harvesting machine, such as a forage harvester, in which the cutting length and/or the broken kernel content of the crop is monitored.

In particular, the image processing system may comprise a Siamese network having two identical neural networks, and the image signal of the camera may be supplied to a first of the neural networks and the reference image may be supplied to a second of the neural networks. The neural networks may be configured to extract feature maps from the images, and a computer may calculate a mathematical distance measure, in particular a Euclidean distance, between the feature maps, with the aid of which distance the degree of similarity can be determined. The networks may be subjected to pseudo-supervised similarity learning, in which the networks are supplied with pairs of training images which contain similar and dissimilar pairs and associated similarity classes.

In one example, the output value of the image processing machine can be displayed on a display device and/or can be used by a control device for automatic control of the harvesting machine or can be used to output a warning message on the display device if a threshold value of the degree of similarity is fallen below. It may be possible that the reference image can be selected by an operator from saved reference images or, during the ongoing harvesting process, an image of the crop, recorded by the camera under suitable crop conditions, can be adopted as the reference image.

Reference will now be made to FIG. 1, which shows an agricultural harvesting machine in the form of a combine harvester 10, which comprises a chassis 12 with driven front and steerable rear wheels 14 in contact with the ground, which support the chassis 12 for forward movement over a field to be harvested. Although wheels 14 are shown, the combine harvester 10 may be supported entirely or partially on caterpillar tracks in contact with the ground. The driving of the front wheels 14 is carried out through a conventional hydrostatic transmission by an internal combustion engine fastened on the chassis 12. In what follows, direction indications (such as forwards) refer to the forward direction of the combine harvester 10, which extends to the right in FIG. 1.

A height-adjustable harvesting attachment in the form of a cutting mechanism 16 is used in order to harvest crop and deliver it to a feeder house 18. The feeder house 18 is hinged pivotably on the chassis 12 and comprises a feeder for delivering the incoming crop to a guide drum 20. The guide drum 20 feeds the crop through an inlet transition section 22 upwards to a rotating threshing and separating assembly 24. Other orientations and types of threshing structures and other types of harvesting attachments 16, such as a transversely extending frame which supports individual row units, may also be used.

During the harvesting operation, the rotating threshing and separating assembly 24 threshes and separates the crop. Grain and chaff fall through grids at the bottom of the rotating threshing and separating assembly 24 into a winnowing system 26. The winnowing system 26 comprises a fan 28, an upper sieve 30 and a lower sieve 32, which separate the chaff. The clean grain is collected over the width of the winnowing system 26 by a transverse feed screw 34, which delivers it to a clean grain elevator 36. The elevator 36 comprises chains and paddles and feeds the clean grain into a transition section 38, from which it is fed into a grain tank 42 by a grain tank filling screw 40. The clean grain in the grain tank 42 can be unloaded by an unloading screw feeder 44 onto a grain wagon or truck. Tailings from the rear end of the lower sieve 32 are returned by a tailings elevator 54 to the rotating threshing and separating assembly 24.

Threshed and separated straw is transferred from the rotating threshing and separating assembly 24 through an outlet 46 to a discharge feeder 48. The discharge feeder 48 in turn ejects the straw at the rear side of the combine harvester 10. It should be noted that the discharge feeder 48 could deliver the material other than grain directly to a straw chopper. The operation of the combine harvester 10 is controlled from within an operator cab 50.

For the optical inspection of the crop and the assessment, based thereon, of the threshing, separating and winnowing processes of the combine harvester 10, an image recording system 52 is provided. It may be arranged on the upgoing side of the elevator 36 and monitor the flow of the grain into the grain tank 42 there, and/or may be positioned as an image recording system 52' at the tailings elevator 54 and monitor the flow of crop tailings there. It would also be conceivable to fit an image recording system (not shown) at a measurement chamber which is discontinuously filled with crop and then emptied again, as disclosed in U.S. Pat. No. 6,285,198 B1 or European Patent Appl. No. EP 0 908 086 A1.

Figure 2:
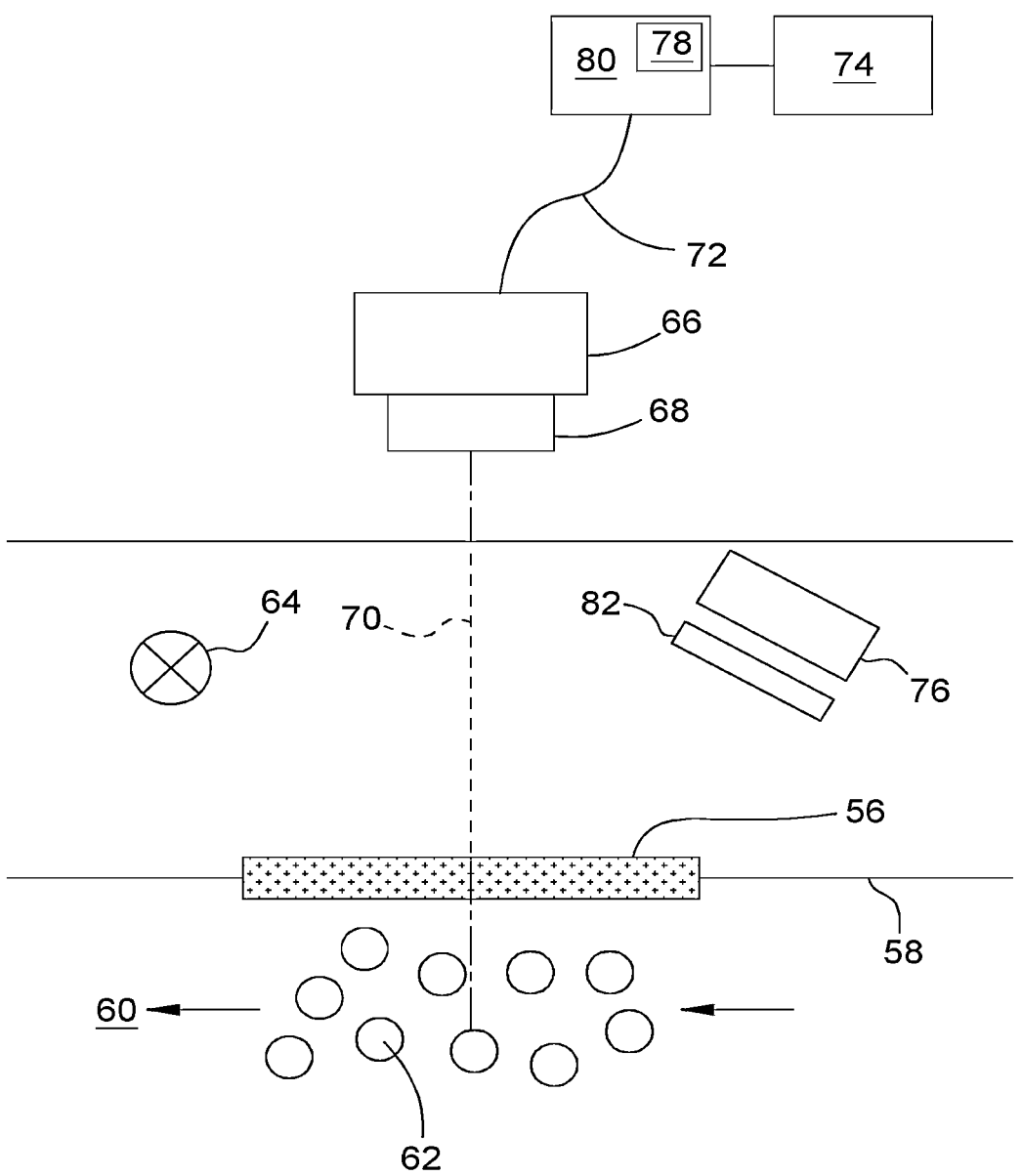
FIG. 2 is a schematic view of the physical structure of an image recording system.

The image recording system 52 shown in FIG. 2 comprises a window 56 transparent for visible light, which is fitted into a wall 58 of the channel 60 conveying the crop 62, which in this case is the elevator 36 or the tailings elevator 54. The window 56 is provided on one or both sides with a treatment layer in order to avoid undesired reflections. The crop 62 is illuminated by one or more light source(s) 64, which are arranged offset from the optical axis 70 of the window 56 and at an angle with respect to the optical axis 70. The light source 64 may be configured as an incandescent lamp, flash lamp, ring flash lamp, or preferably as a light-emitting diode. An objective lens 68 of a camera 66 is arranged on the optical axis 70 of the window 56 and looks through the window 56 at the crop 62 in the channel 60. An optional near-infrared sensor having a dispersive element 82 and a detector array 76 may be used to analyse constituents of the crop 62 (although this requires a light source 64 with a sufficiently continuous spectrum). In a different way than is shown, the image recording system 52 could also comprise two light sources 64, one each of which is respectively allocated to the camera 66 and to the near-infrared sensor (see European Patent Appl. No. EP 1 956 361 A2), or the near-infrared sensor may be omitted.

Figures 3, 4, 5, 6, 7:
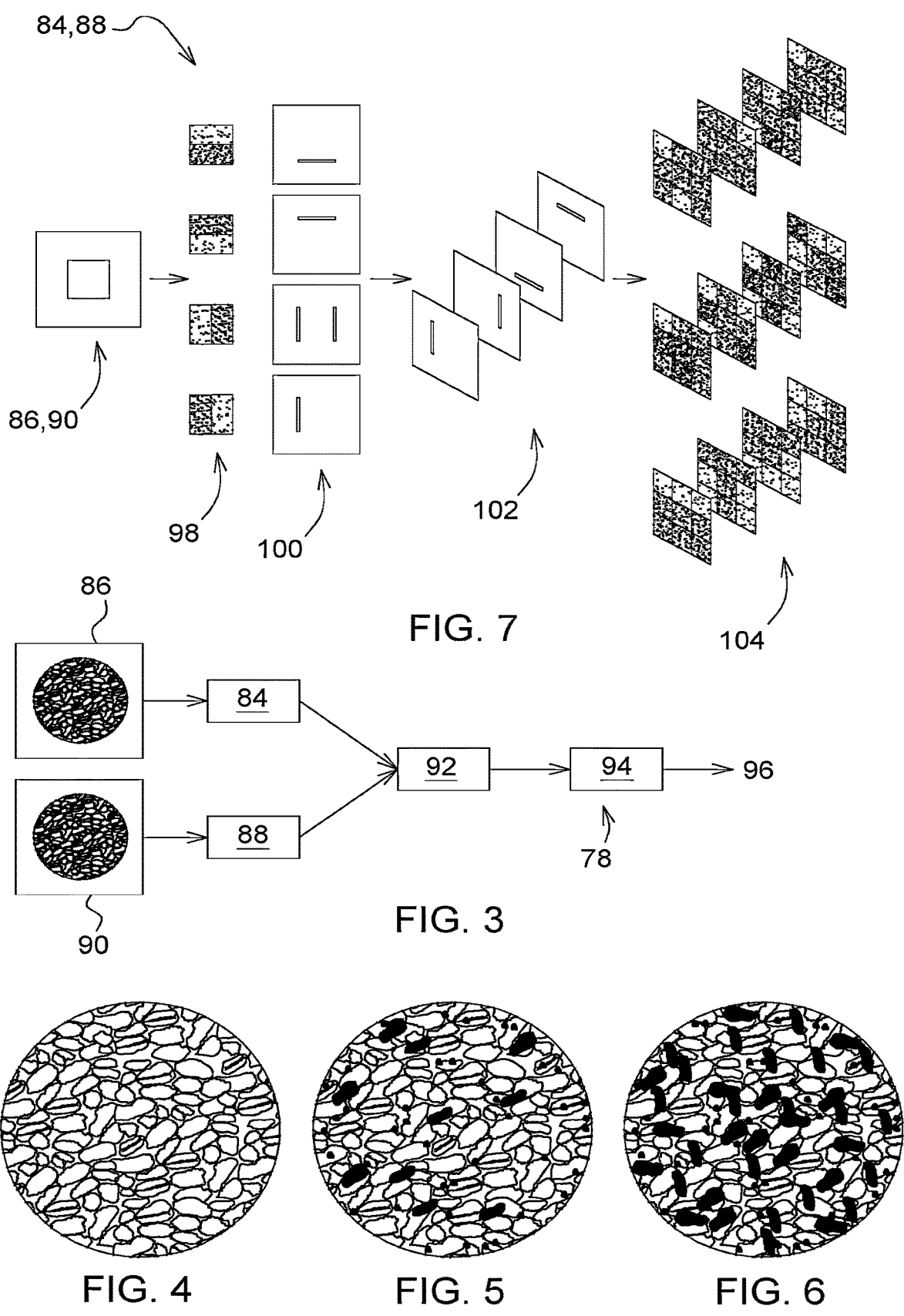
FIG. 3 shows a diagram of the image processing system.
FIGS. 4-6 show examples of camera images.
FIG. 7 shows the procedure of the neural networks of the image processing system.

The camera 66 has a digital output, which is connected by a cable 72 to an electronic control device 80 that comprises an image processing system 78 and is connected to a display device 74. During operation, the camera 66 continuously records images of the crop 62, and these are analysed by the image processing system 78. The results of the image processing system 78 are forwarded directly or via the control device 80 to the display device 74. Typical images of the camera 66 allocated to the image recording system 52 (positioned at the elevator 36), which therefore shows grain in the elevator 36, are represented in FIG. 4 (with properly winnowed grain), FIG. 5 (grain with some impurities) and FIG. 6 (grain with very many impurities). On the display device 74, the unprocessed or processed image of the camera 66 and/or information derived therefrom, for example a calculated degree of contamination, may be displayed in a special menu or an allocated region on the display surface.

Reference will now be made to FIG. 3, in which the structure of the image processing system 78 is shown. It comprises a first neural network 84 which is supplied with the current/supplied image (signal) 86 of the camera 6 as well as a second neural network 88 (of the same type), which is supplied with a saved reference image 90 that represents optimally winnowed grain. In another example, the first neural network 84 is supplied with the saved referenced image 90 and the second neural network 88 is supplied with the current/supplied image (signal) 86. The reference image 90 may be stored permanently in the image processing system 78 or may have been selected from saved images, or it is recorded by the camera 66 during the ongoing harvesting process and saved when the operator has decided with the aid of the image of the camera 66 displayed on the display device 74 that they are satisfied with the quality (winnowing and damaged kernel fraction) of the crop 62 and make a corresponding entry which prompts the image processing system 78 to accept and save the current image of the camera 66 as a reference image 90.

A first computer 92 is connected to the outputs of the two networks 84, 88 and calculates a mathematical distance measure, in particular a Euclidean distance, between output values of the networks 84, 88. A second computer 94 calculates a loss function and delivers a result 96, which represents a measure of the similarity of the two images 86, 90, to the display device 74. It should also be noted that the networks 84 and 88 and the computers 92, 94 are not to be understood as being hardware units but are merely intended to reflect the functions carried out. They may therefore be implemented as software modules or algorithmic functional blocks on one or more processors.

The image processing system 78 is a so-called "Twin Network" or "Siamese Artificial Neural Network" such as used for example in face recognition. The image processing system 78 therefore delivers (only) with the aid of the current image 86 of the crop, which is respectively recorded by the camera 66, and with the aid of the saved reference image 90, a result 96 which reflects the degree of similarity of the two images 86, 90.

For instance, the image shown in FIG. 4 could be used as a reference image 90, and for the image shown in FIG. 5, which shows a very high proportion of impurities (husks), a relatively low degree of similarity of for example 35% would be obtained as a result 96, whereas for the image according to FIG. 6, which shows almost only impurities, an even lower degree of similarity would be obtained.

It is unnecessary to specify any data in respect of dimensions of the crop and impurities or make a classification with the aid of manually evaluated images, and the image processing system 78 can be attuned rapidly and easily to any types of crop with the aid of the reference image 90. With the aid of the result 96 (degree of similarity), the operator can be given advice on the display device 74, when a predetermined threshold value is fallen below (for example when the degree of similarity has dropped below 91%), that readjustment of working parameters of the threshing and separating assembly 24 and/or of the winnowing system 26 and/or a change in the driving speed seems expedient. Additionally—in a similar way to EP 1 763 988 A1—a test run with different settings of working parameters of the threshing and separating assembly 24 and/or of the winnowing system 26 and/or driving speeds may be run through automatically, the setting which has given the greatest similarity of the image 86 to the reference image 90 finally being selected.

In order to explain the functionality of the neural networks 84, 88, reference will now be made to FIG. 7. The basis of the image processing used here is a group of neural networks 84, 88 which are known as convolutional neural networks. In order to understand the algorithm used here, it is sufficient that the networks 84, 88 are used as tools to extract features. In terms of the functionality, reference is also made to the literature relating to Siamese neural networks, for example G. Koch et al., Siamese Neural Networks for One-shot Image Recognition, Proceedings of the $32^{nd}$ International Conference on Machine Learning, Lille, France, 2015. JMLR: W&CP Vol. 37 (downloaded on 8.12.2021 from https://www.cs.cmu.edu/~rsalakhu/papers/oneshot1.pdf) or D. Chicco, "Siamese neural networks: an overview", *Artificial Neural Networks*, Methods in Molecular Biology, 2190 (3rd ed.), New York City, New York, USA: Springer Protocols, Humana Press, pp. 73-94 (2020), the disclosures of which are hereby incorporated by reference.

FIG. 7 shows the procedure for extracting features. This is an essential step for extracting important (having a meaningful information content) features from the images 86, 90 obtained by the camera 66. As shown in FIG. 7, a series of (convolution) filters 98 is applied to the respectively incoming image 86, 90 in order to obtain a first set of representative feature maps 100. The first set of feature maps 100 is arranged successively in a stack 102. This stack 102 forms the input value for a second layer of feature maps 104. This process of generating the second layer of feature maps 104 is repeated until the high-dimensional images 86, 90 are compressed and saved (subsampled) and representative feature maps 104 have been extracted along the height, width and depth (channels) of the video data.

As mentioned above and shown in FIG. 3, a Siamese twin network is employed in the image processing system 78. In this case, pseudo-supervised similarity learning is used. As the name suggests, this procedure uses pseudo-supervision in order to learn a similarity function that recognizes whether or not a given input image 86 is similar to the reference image 90. The output 96 of the network is a similarity value which can lie between 0 and 1, 1 representing the highest similarity and 0 representing the lowest similarity. The neural network architecture used for this output is the Siamese twin network known per se, which requires a demonstrably short processing time and is reliable against mistakes, as has been demonstrated with the aid of signature verification, face recognition and the like. The present procedure aims to draw inspiration from such previous successful tasks and use the success of Siamese twin networks to detect irregularities in the crop to be inspected.

The underlying architecture of the Siamese network used here is represented in FIG. 3. The two networks 84, 88 are identical in all aspects, including the architecture, the parameter value, optimization strategies, etc., which is also the reason for the name.

The two networks 84, 88 are initially subjected to training before use. For this purpose, instead of the images 86, 90, the networks 84, 88 are supplied with suitable pairs of training images. These include pairs which are classified as similar as well as pairs of images which are classified as dissimilar. The pairs associated with a similar class are referred to as positive pairs, and those which belong to a dissimilar class are referred to as negative pairs. In the case of inspecting anomalies of grain, as in the present exemplary embodiment, a pair of images which shows samples of grain with good quality is referred to as a positive pair and allocated to class 1. Similarly, a pair which contains one image with good grain quality and one image with anomalies is denoted as a negative pair and allocated to class 2. This process is carried out iteratively until a sufficiently large number of images from the training image set have been arranged in positive and negative pairs.

According to the following step, the two images are fed as a pair through the two networks 84, 88 and embeddings or feature maps are obtained (as described with the aid of FIG. 3). These embeddings or feature maps 100 are subsequently compared by the computer 92 which determines a mathematical distance measure, in particular a Euclidean distance, this involving an adapted layer operation, in order to obtain a result value for the embedding. The calculation of the distance measure will give a low result value for the embedding if the inspected pair is similar and a high result value in the converse case. For each pair inspected, this means that if the two images are similar, the result will be almost identical feature maps which will furthermore give a low result value for the embedding after the calculation of the distance measure.

Finally, the model (the networks) is trained by using a binary cross-entropy loss function, precisely like a binary classification task. The difference here is that the classification is carried out in order to establish whether or not the given pair belongs to a similar class. An example of this training is shown in FIG. 3. There, a negative image pair is fed through the identical twin network 84, 88 with shared (i.e., identical) architecture and parameters. Since the pair does not belong to the same class, the result value of the distance calculation (of the Euclidean distance layer) for the embedding will be a high value. At the same time, this pair has already been identified as class 2, or a dissimilar class. When the network is trained with the aid of the binary cross-entropy loss function, the network will be strengthened or encouraged to maximize the similarity between positive pairs and to minimize the similarity between negative pairs. This happens by the network 84, 88 learning that those pairs with high embedding result values are dissimilar or negative pairs and those with low embedding result values are similar or positive pairs.

In real-time application, possible anomalies are registered. An image of high-quality crop 62 is used as a reference image 90 and this is compared image-by-image (or from time-to-time) with the incoming video image stream of the camera 66. This means that the image pair supplied to the twin networks 84, 88 consists of the reference image 90 and the image 86 of the camera 66. The result 96 output will be a similarity result between 0 and 1, the results lying closer to 1 indicating a high similarity of the image 86 with the reference image 90. By setting a threshold, it is relatively easy to recognize anomalous grain samples during the harvesting operation in real time.

FIG. 5 shows an image 86 or 90 of wheat with a high quality of the crop 62, which may be used as a reference image 90 for comparison with the incoming images 86 of the camera 66. Unlike other approaches, approaches based on Siamese networks tend to deliver better performance on uncoloured greyscale images, and the training and the evaluation may therefore be carried out in the black-and-white colour scheme in the present case, although they may also be carried out with colour images. On the display device 74, however, the images 86, 90 may be displayed in colour. So long as the image 86 resembles that according to FIG. 4, a relatively high degree of similarity with the reference image 90 will be output. If however, as shown in FIG. 5, the image 86 contains impurities or anomalies, which are also referred to as material other than grain (MOG), the result value for the similarity will be very low and it may therefore be deduced with high certainty that the sample is anomalous and that readjustment of working parameters of the combine harvester 10 then seems expedient (and the sample cannot be used as a reference in any case). For the sample of FIG. 5, a degree of similarity of 35% would be determined with reference 90 according to FIG. 4, and a degree of similarity of 0% would be determined for the very contaminated sample of FIG. 6.

One advantage of the present procedure is that the image processing 78 is very insensitive to different camera settings (exposure, magnification, etc.), even if the reference image 90 has been recorded with a different camera 66 or under different conditions. The network is nevertheless capable of outputting a meaningful degree of similarity. It is merely necessary to ensure that the network receives a usable reference image 90 and a current image 86 of the crop 62 which reflects possible changes.

Compared with the previous approach of supervised learning, the advantages are therefore obtained that there is no need for active supervision or different sets of classified images for the learning, that the predicted result is a measure of the similarity instead of probabilities of particular classes, that substantially less data is needed for the learning and there is the possibility of setting a meaningful threshold for unusable samples, that the procedure is insensitive to camera settings and other dynamic changes and the model does not need to be trained continually with new classes, and that essentially a single learning process is sufficient.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

It should also be noted that the different examples described herein can be combined in different ways. That is, parts of one or more examples can be combined with parts of one or more other examples. All of this is contemplated herein.

The invention claimed is:

1. A system for optical assessment of crops in a harvesting machine, the system comprising:
  a camera configured to record an image of a harvested crop, the harvested crop having been cleaned by a cleaning system in the harvesting machine; and
  an image processing system that includes first and second neural networks, the first and second neural networks are subjected to pseudo-supervised similarity learning, in which the first and second neural networks are supplied with pairs of training images having similar and dissimilar pairs and associated similarity classes, the image processing system configured to:
  receive the recorded image from the camera to the first neural network;
  receive a reference image to the second neural network, the reference image of a cleaned crop;
  use the first and second neural networks to extract at least one feature map from at least one of the recorded image of the harvested crop and the reference image of the cleaned crop;
  calculate a degree of similarity based on the at least one feature map;
  generate an output value based on the degree of similarity between the reference image of the cleaned crop and the recorded image of the harvested crop;
  identify a reference working parameter for the harvesting machine associated with the harvesting of the cleaned crop in the reference image; and
  cause presentation of advice to an operator on a display device based on the output value, the advice to adjust a working parameter of the harvesting machine to the reference working parameter.

2. The system of claim 1 wherein the camera is configured to view a channel in which the harvested crop flows.

3. The system of claim 1 wherein the output value is displayed on the display device, the output value supplied to a control device for automatic control of the harvesting machine.

4. The system of claim 3 wherein the output value is used by a control device to output a warning message on the display device if a threshold value of the degree of similarity is fallen below.

5. The system of claim 1 wherein the reference image of the cleaned crop can be selected by an operator from at least one of a database of saved reference images.

6. The system of claim 1, wherein the output value is between 0 and 1.

7. The system of claim 6, wherein the output value 1 represents the highest similarity and the output value 0 represents the lowest similarity.

8. The system of claim 1, wherein the image processing system is insensitive to camera settings used to capture the recorded image of the harvested crop or the reference image of the cleaned crop.

9. The system of claim 1, wherein the first and second neural networks are identical.

10. The system of claim 3 wherein, based on the output value, the control device is to change a threshing gap of the harvesting machine or change a rotational speed of a threshing drum of the harvesting machine.

11. The system of claim 1 wherein the crop is grain and the harvested crop is cleaned by winnowing.

12. The system of claim 1 wherein the camera is downstream of the cleaning system in the harvesting machine.

13. A method for optical assessment of crop in a harvesting machine, the method comprising:
  cleaning harvested crop in a cleaning system of the harvesting machine;
  recording, with a camera, a supplied image of the harvested crop;
  accessing, with a first neural network, the supplied image of the harvested crop from the camera;
  accessing, with a second neural network, a reference image of cleaned crop, the first and second neural networks forming a Siamese twin network, the first and second neural networks are subjected to pseudo-supervised similarity learning;

extracting, via the first and second neural networks, at least one feature map from at least one of the supplied image of the harvested crop and the reference image of the cleaned crop;

determining a degree of similarity of the reference image of the cleaned crop and the supplied image of the harvested crop based on the at least one feature map;

generating an output value relating to a property of the harvested crop using at least in part the determined degree of similarity;

identifying a reference working parameter for the harvesting machine associated with the harvesting of the cleaned crop in the reference image; and causing presentation of advice to an operator on a display device based on the output value, the advice to adjust a working parameter of the harvesting machine to the reference working parameter.

14. The method of claim 13, wherein the camera is configured to view a channel in which the harvested crop flows.

15. The method of claim 13 further comprising displaying the output value on the display device, the output value supplied to a control device for automatic control of the harvesting machine.

16. The method of claim 13 further comprising sending the output value to a control device and generating a warning message on the display device if a threshold value of the degree of similarity is fallen below.

17. The method of claim 13 further comprising selecting, by an operator, the reference image of the cleaned crop from a database of saved reference images.

18. The method of claim 13 further comprising selecting, by an operator, the reference image of the cleaned crop from an image of the harvested crop recorded by the camera during an ongoing harvesting process.

19. An apparatus for optical assessment of crops in a harvesting machine comprising:

machine-readable instructions; and programmable circuitry to execute the instructions:

train first and second neural networks via pseudo-supervised similarity learning, in which the first and second neural networks are supplied with pairs of training images having similar and dissimilar pairs and associated similarity classes;

extract a feature map from at least one of:

an image supplied by a camera of harvested crop using the first neural network, the harvested crop cleaned by a cleaning system of the harvesting machine, or a reference image of cleaned crop using the second neural network;

calculate a mathematical distance and a degree of similarity based on the feature map;

generate an output value based on the mathematical distance and the degree of similarity;

identify a reference working parameter for the harvesting machine associated with the harvesting of the cleaned crop in the reference image; and cause presentation of advice on a display device based on the output value, the advice to adjust a working parameter of the harvesting machine to the reference working parameter.

20. The apparatus of claim 19, wherein the output value is indicative of how clean the harvested crop is.

* * * * *